(12) United States Patent
Ward et al.

(10) Patent No.: US 10,392,977 B2
(45) Date of Patent: Aug. 27, 2019

(54) AUTOMOTIVE LUBRICANT PUMPING SYSTEM WITH TWO PIECE RELIEF VALVE

(71) Applicant: SLW Automotive Inc., Rochester Hills, MI (US)

(72) Inventors: Lyle V Ward, Royal Oak, MI (US); Edward Elliot, Clinton Township, MI (US)

(73) Assignee: SLW Automotive Inc., Sallisaw, OK (US)

( * ) Notice: Subject to any disclaimer, the term of this patent is extended or adjusted under 35 U.S.C. 154(b) by 176 days.

(21) Appl. No.: 15/427,267

(22) Filed: Feb. 8, 2017

(65) Prior Publication Data

US 2017/0234176 A1 Aug. 17, 2017

Related U.S. Application Data

(60) Provisional application No. 62/294,062, filed on Feb. 11, 2016.

(51) Int. Cl.
*F01M 1/16* (2006.01)
*F16K 31/124* (2006.01)
(Continued)

(52) U.S. Cl.
CPC ............ *F01M 1/16* (2013.01); *F01M 1/02* (2013.01); *F01M 11/0004* (2013.01); *F16K 31/1221* (2013.01); *F16K 31/1225* (2013.01); *F16K 31/1245* (2013.01); *F01M 2001/0238* (2013.01); *F01M 2001/0269* (2013.01)

(58) Field of Classification Search
CPC ........ F01M 1/16; F01M 1/02; F01M 11/0004; F01M 2001/0238; F01M 2001/0269; F16K 31/1225; F16K 31/1245; F04B 53/18; F04C 2210/206; F15B 13/0402; F15B 13/0417;
(Continued)

(56) References Cited

U.S. PATENT DOCUMENTS 2,945,449 A * 7/1960 Lefebvre ................. F04B 1/126
60/444
2,998,017 A * 8/1961 Cavalieri ................ F01D 21/20
415/16
(Continued)

FOREIGN PATENT DOCUMENTS

EP 1559937 A1 8/2005

*Primary Examiner* — David Hamaoui
*Assistant Examiner* — John D Bailey
(74) *Attorney, Agent, or Firm* — Warn Partners, P.C.

(57) ABSTRACT

A lubrication pumping system for an oil lubricated engine is provided that includes a pump with an outlet and inlet. A relief valve is included having a housing with a multidimensional bore having a first diameter section axially intersecting with a second different diameter section. Slidably mounted in the first section is a spring biased primary piston have a first landing for metering flow between a pump discharge connection and a pump inlet connection. A secondary piston is provided in a second different diameter section of the valve housing bore. The inventive system allows for multiple modes of operation of oil pressure versus engine speed relationships by control of the pilot pressure to minimize parasitic loads exerted by the oil pump on the vehicle engine.

16 Claims, 9 Drawing Sheets

(51) Int. Cl.
*F16K 31/122* (2006.01)
*F01M 1/02* (2006.01)
*F01M 11/00* (2006.01)

(58) Field of Classification Search
CPC . F16N 23/00; Y10T 137/2615; Y10T 137/263
USPC ....... 137/115.15, 115.21; 417/228, 229, 304, 417/39
See application file for complete search history.

(56) References Cited

U.S. PATENT DOCUMENTS

| | | | |
|---|---|---|---|
| 3,229,721 A | 1/1966 | Bingel | |
| 3,523,555 A | 8/1970 | Padula | |
| 3,536,293 A | 10/1970 | Burris | |
| 3,777,773 A * | 12/1973 | Tolbert | F15B 13/0417 137/115.15 |
| 3,918,351 A | 11/1975 | Finke | |
| 3,937,430 A | 2/1976 | Engle | |
| 4,254,799 A * | 3/1981 | Blatt | F15B 13/0402 137/625.66 |
| 4,325,402 A | 4/1982 | Akkerman et al. | |
| 4,334,442 A * | 6/1982 | Iwanaga | F16H 61/0267 477/128 |
| 4,494,916 A | 1/1985 | White, Jr. | |
| 5,031,656 A | 7/1991 | Benford et al. | |
| 5,066,077 A | 11/1991 | Farr | |
| 5,173,035 A * | 12/1992 | Mukumoto | F01L 25/063 137/512.3 |
| 5,442,916 A | 8/1995 | Saito et al. | |
| 5,580,817 A * | 12/1996 | Kortge | B62D 5/06 137/115.15 |
| 5,586,570 A | 12/1996 | Fukano et al. | |
| 5,595,218 A | 1/1997 | Hallbach et al. | |
| 5,937,645 A * | 8/1999 | Hamamoto | F15B 13/0417 60/422 |
| 6,053,195 A * | 4/2000 | Heer | F01M 1/16 137/115.21 |
| 6,374,848 B1 | 4/2002 | McGhee | |
| 6,810,845 B1 * | 11/2004 | Plenzler | F01L 1/34 123/196 R |
| 6,945,610 B1 | 9/2005 | Mizutani et al. | |
| 7,396,214 B2 | 7/2008 | Hunter et al. | |
| 7,540,299 B2 * | 6/2009 | Muller | F16D 25/123 137/115.15 |
| 7,674,095 B2 * | 3/2010 | Hunter | F01C 11/002 417/220 |
| 7,775,503 B2 * | 8/2010 | Zhou | F01M 1/20 137/523 |
| 8,430,645 B2 | 4/2013 | Jannausch et al. | |
| 8,512,006 B2 | 8/2013 | Hunter | |
| 9,068,497 B2 | 6/2015 | Anderson et al. | |
| 9,388,804 B2 * | 7/2016 | Williamson | F01M 1/16 |
| 9,945,275 B2 * | 4/2018 | Kishi | F01M 1/08 |
| 2009/0101092 A1 * | 4/2009 | Ichinosawa | F04C 11/006 123/90.15 |
| 2011/0094225 A1 * | 4/2011 | Kistner | F01M 1/12 60/605.3 |
| 2011/0126784 A1 * | 6/2011 | Kobayashi | F01M 1/16 123/41.02 |
| 2011/0283968 A1 * | 11/2011 | Anderson | F01M 1/16 123/196 R |
| 2012/0073535 A1 * | 3/2012 | Hoppe | F01L 1/34 123/188.4 |
| 2012/0103442 A1 * | 5/2012 | Min | F01M 1/16 137/538 |
| 2012/0103447 A1 * | 5/2012 | Min | F01M 1/16 137/565.35 |
| 2013/0142627 A1 * | 6/2013 | Kwon | F04C 14/26 415/146 |
| 2013/0152883 A1 * | 6/2013 | Perotto | F01P 3/10 123/41.35 |
| 2013/0343937 A1 * | 12/2013 | Williamson | F01M 1/16 417/447 |
| 2015/0192058 A1 * | 7/2015 | Palumbo | F01M 1/08 123/41.08 |
| 2016/0115832 A1 * | 4/2016 | Celata | F04C 2/3442 417/364 |

* cited by examiner

AUTOMOTIVE LUBRICANT PUMPING SYSTEM WITH TWO PIECE RELIEF VALVE

CROSS-REFERENCE TO RELATED APPLICATIONS

This application claims the benefit of U.S. Provisional Application No. 62/294,062, filed Feb. 11, 2016. The disclosure of the above application is incorporated therein by reference.

FIELD OF THE INVENTION

The present invention relates to the lubricant pumping systems for engines of automotive vehicles, particularly automotive vehicles with reciprocal piston type engines.

BACKGROUND OF THE INVENTION

In the field of fluid pumps used in vehicles, particularly oil pumps, it is desirable to control the amount of oil flowing through an oil circuit. Controlling the flow can have many advantages, particularly with respect to fuel economy. For example, when a vehicle speeds up a pump can provide an unnecessary increase in oil pressure due to the pump working at a greater rate which results in an increased power load on an engine crank shaft. When a vehicle is moving at slow speeds, a certain pump displacement is needed to produce required oil pressure in the circuit, however at higher speeds and the same pump displacement lead to higher flow than needed, the excess flow represents an increased parasitic load on the engine. To reduce the parasitic load, variable displacement oil pumps have been utilized. However, variable displacement pumps typically add more complexity and cost to the lubrication system not only the pump, but also other valves and hydraulic components associated with the system. With the utilization of smaller engines in automotive vehicles, it has become harder to cost justify the benefit that the utilization of variable displacement oil lubrication pumping systems provide. It is desirable to provide an all lubrication system that can be utilize with a fixed displacement oil pump that provides similar advantages previously only available with lubrication systems utilizing variable displacement pumps.

SUMMARY OF THE INVENTION

To make manifest the above noted and other desires, a revelation of the present invention is brought forth. In a preferred embodiment, the present invention endows a freedom of a lubrication pumping system for an oil lubricated engine of an automotive vehicle that includes a pump with an outlet and an inlet. A two piece relief valve is provided having a housing with a multidimensional bore having a first diameter section axially intersecting with a second different diameter section. Slidably mounted with in the first section is a spring biased primary piston have a first landing for metering flow between a pump discharge connection and a pump inlet connection. A secondary piston is provided in a second diameter section of the valve housing bore. Adjacent the intersection of the first and second sections of the valve housing bore is a pilot pressure connection that is selectively connected with a pilot pressure. The pilot pressure is generally equal to the oil pressure in the main oil gallery or the sump pressure or some value therebetween. The second diameter section is connected with the main oil gallery pressure to allow engine at pressure to act upon the secondary piston. The inventive system allows for multiple modes of operation of oil pressure versus engine speed relationships by control of the pilot pressure to minimize parasitic loads exerted by the oil pump on the vehicle engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
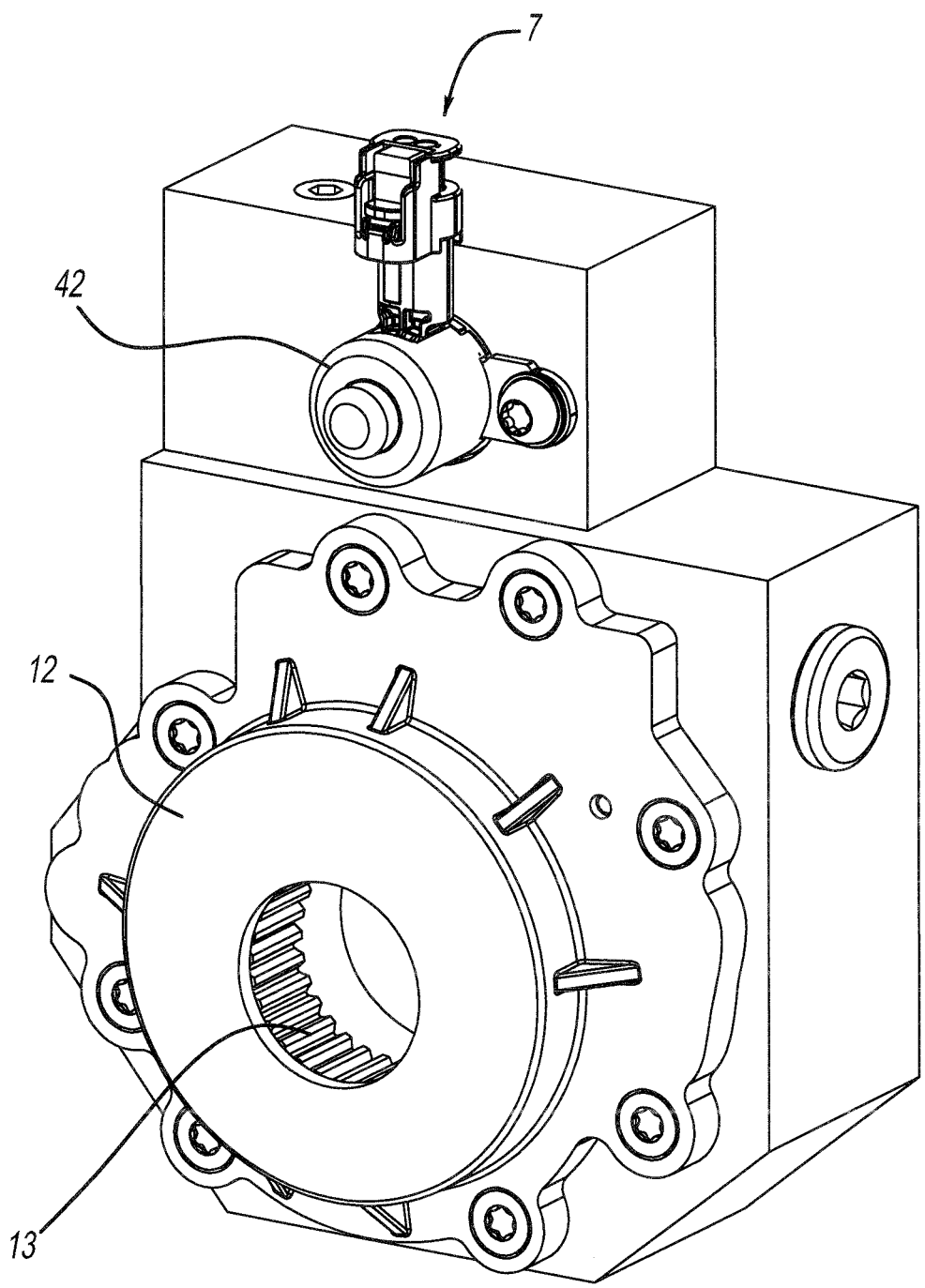
FIG. 1 is a perspective view of a preferred embodiment lubrication pumping system according to the present invention.
Figure 2:
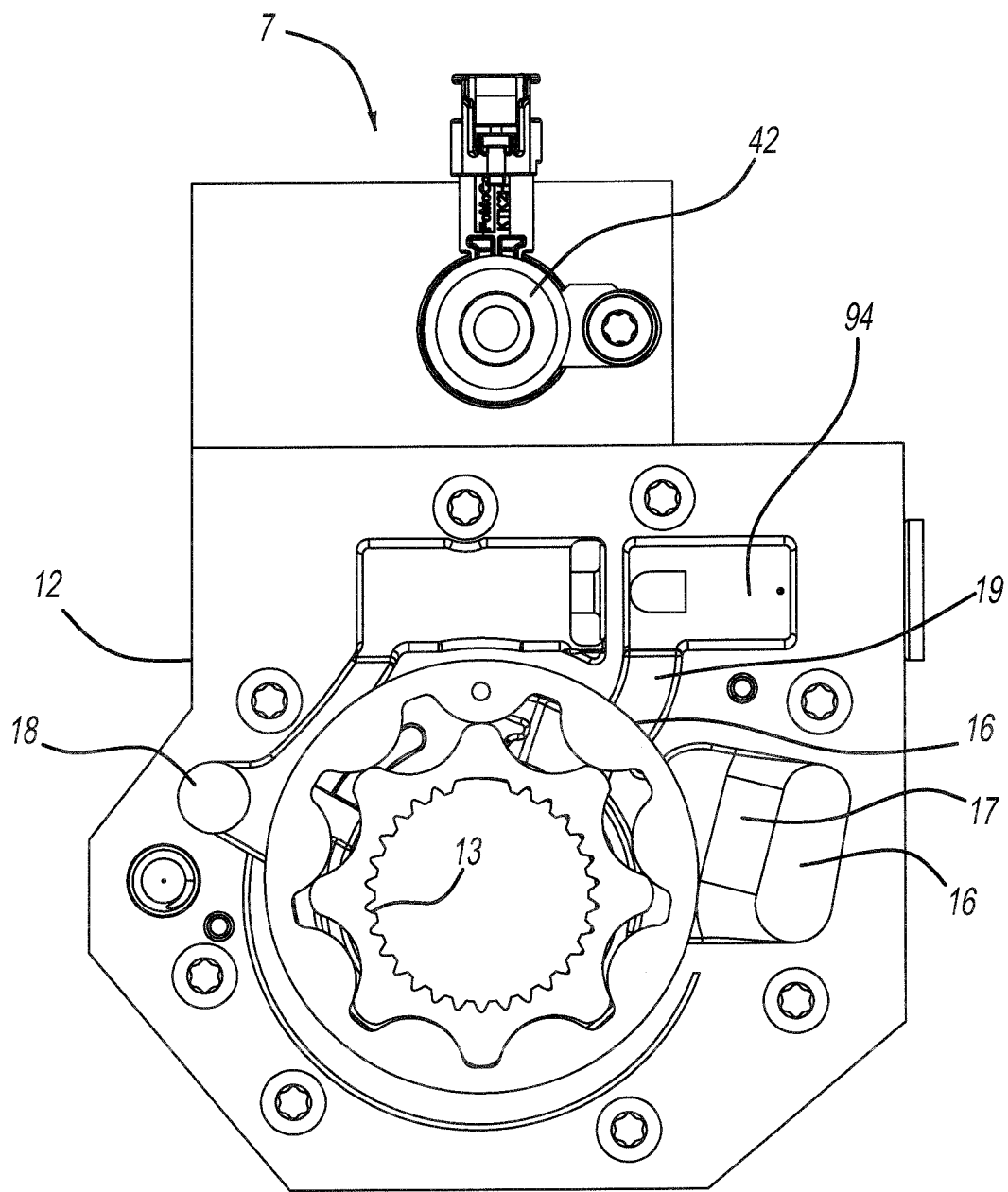
FIG. 2 is a view similar to that of FIG. 1 with a cover of a pump shown in FIG. 1 removed.
Figure 3:
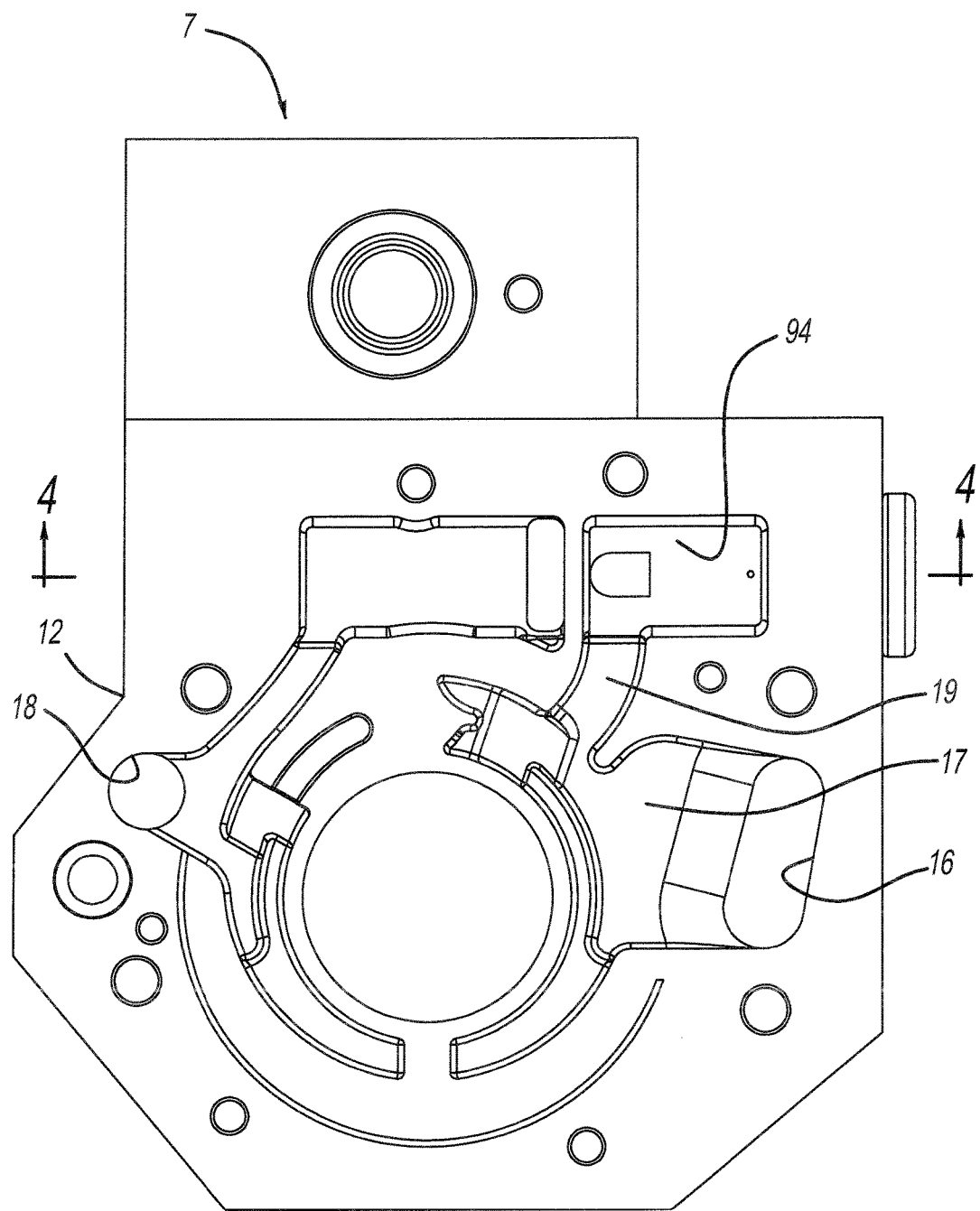
FIG. 3 is a view similar to that of FIG. 2 with the rotors of the pump shown in FIG. 2 removed illustrating the hydraulic flow path of the pump.

The following description of the preferred embodiment(s) is merely exemplary in nature and is in no way intended to limit the invention, its application, or uses.

Referring to FIGS. 1-7, a lubrication pumping system 7 of the present invention is provided. The pumping system 7 is for lubricating an internal combustion engine 10 for an automotive vehicle, typically a reciprocating piston type engine 10. The system 7 has an oil pump 12. The pump 12 will typically be a constant displacement gerotor type pump with non-concentric rotors 13, 15. The pump 12 is typically torsionally connected by belt or gear train with a crankshaft (not shown) of the engine 10. A typical pump 12 for a small, midsize, large passenger or small truck automotive vehicle and has an output capacity of 20-120 liters per minute at 1.0-6.0 bar pressure when the crankshaft of the engine 10 rotates at 700-7000 revolutions per minute. The pump 12 has inlet 16 and a discharge or outlet 18. The inlet 16 is fluidly connected with a sump 20. The pump outlet 18 is fluidly connected with a filter 22 that filters the oil before oil entry into the engine 10. The engine 10 may have various oil consuming components including normal lubrication of the pistons, rods and valve train as well as valve lifters, piston squirts and variable cam timing phase shifters. It is desirable that the system 7 have at least low and high modes of operation, the high mode of operation typically required for engine speeds exceeding 3000 RPM.

The system 7 also includes a two piece relief valve 23 with a valve housing 24. Typically, the valve housing 24 may be fabricated from steel, aluminum, or a rigid polymeric material. The valve housing 24 has a multi-dimensional bore 30 having a first diameter section 32. The first section 32 is typically 10-20 millimeters in diameter. The bore first section 32 is intersecting with a concentric smaller diameter second section 34. The first section 32 has a generally transverse connection 36 that is fluidly connected with the pump inlet 16. Pump inlet 16 has one branch 17 connected with the sump 20 and a second branch 19 connected with the first section 32. Axially spaced from the connection 36, the first section 32 has a generally transverse connection 38. Connection 38 is fluidly connected with the pump outlet 18. Axially spaced from pump outlet connection 38 is a pilot pressure connection 40. Pilot pressure connection 40 is typically located adjacent an extreme forward end of the first section 32. Pilot pressure connection 40 is connected with a pressure mode selection valve typical provided by a solenoid valve 42. The solenoid valve 42 can selectively connect the pilot pressure connection 40 with the sump 20 or the engine oil pressure typically at a main oil gallery. Solenoid valve 42 may be a simple on off type solenoid valve, or a proportional valve of an analog type or a duty cycle type.

A controller 44 typically commands solenoid valve 42. The controller 44 may be a separate component or part of a multifunctional controller such as the engine controller. Controller 44 may be in the immediate vicinity of solenoid valve 42 or may be remotely located. Typically, controller 44 will command signal the solenoid valve 42 based upon one or more engine properties such as engine speed, engine temperature, engine oil temperature, valve actuation, valve timing, main oil gallery pressure, power demand, or derivatives thereof.

Valve housing bore second section 34 typically has a blind end 48. Adjacent the blind end 48 is an engine pressure connection 50. Engine pressure connection 50 is typically connected with the main oil gallery of the engine 10. Although in FIG. 4, the connections 36, and 38, 40 and 48 are shown in a common plane they need not be so and in most instances will not be.

Slidably mounted in the valve housing bore first section 32 is a primary valve spool or piston 60. Piston 60 is spring biased towards the second section 32 by a coil spring 62. The spring 62 abuts a plug 64 that seals the bore 30. The primary piston 60 has a cavity 66 to accommodate the spring 62. The cavity 66 has a blind end 68. The primary piston 60 has a first landing 74 for metering out flow from the pump outlet connection 38 to the pump inlet connection 36. Axially spaced from the first landing 74, the primary piston has a second landing 76 dividing a portion of the first section 32 exposed to the pump outlet connection 38 from that portion of the second section exposed to the pilot pressure connection 40. Between the first landing 74 and the second landing 76, the primary piston 60 has a reduced diameter section 78.

Slidably mounted in the second section 34 is a nose spool or secondary piston 80. Piston 80 divides the portion of the second section exposed to the engine pressure connection 50 from that portion of the second section that is exposed to the intersecting first section 32. Both the primary and secondary pistons 60, 80 have close clearance with their respective bores to eliminate the need for sealing rings on the pistons or first and second bore sections 32 and 34. Primary piston 60 and secondary piston 80 have opposing faces 86 and 88 respectively.

The face 88 of the secondary piston has a conic cross-sectional shape forming a semi-spherical shape. The opposing face 86 of the primary piston is generally flat. This gives the opposing faces 86 and 88 semi-unipoint contact. The semi-unipoint contact allows both surfaces 86 and 88 to be fully acted upon by the pilot pressure within the portion of the housing bore 30 that is exposed to the pilot pressure connection 40. Additionally any concentric misalignment between the housing bore first section 32 and housing bore second section 34 limits moment (side) loading of either the primary piston 60 or the secondary piston 80 by virtue of the contact between the opposing faces 88 and 86. Thus, friction and hysteresis is keep low. The above noted feature therefore increases the amount of non-concentricity between the bore first section 32 and bore second section that is allowable, thereby lowering machining cost.

A valve housing 24 also has an aperture 92 extending between the housing bore first section 32 and a manifold 94 connected with the pump Inlet 16 to allow pump suction to remove any fluid trapped behind the primary piston first landing 74.

Figure 4:
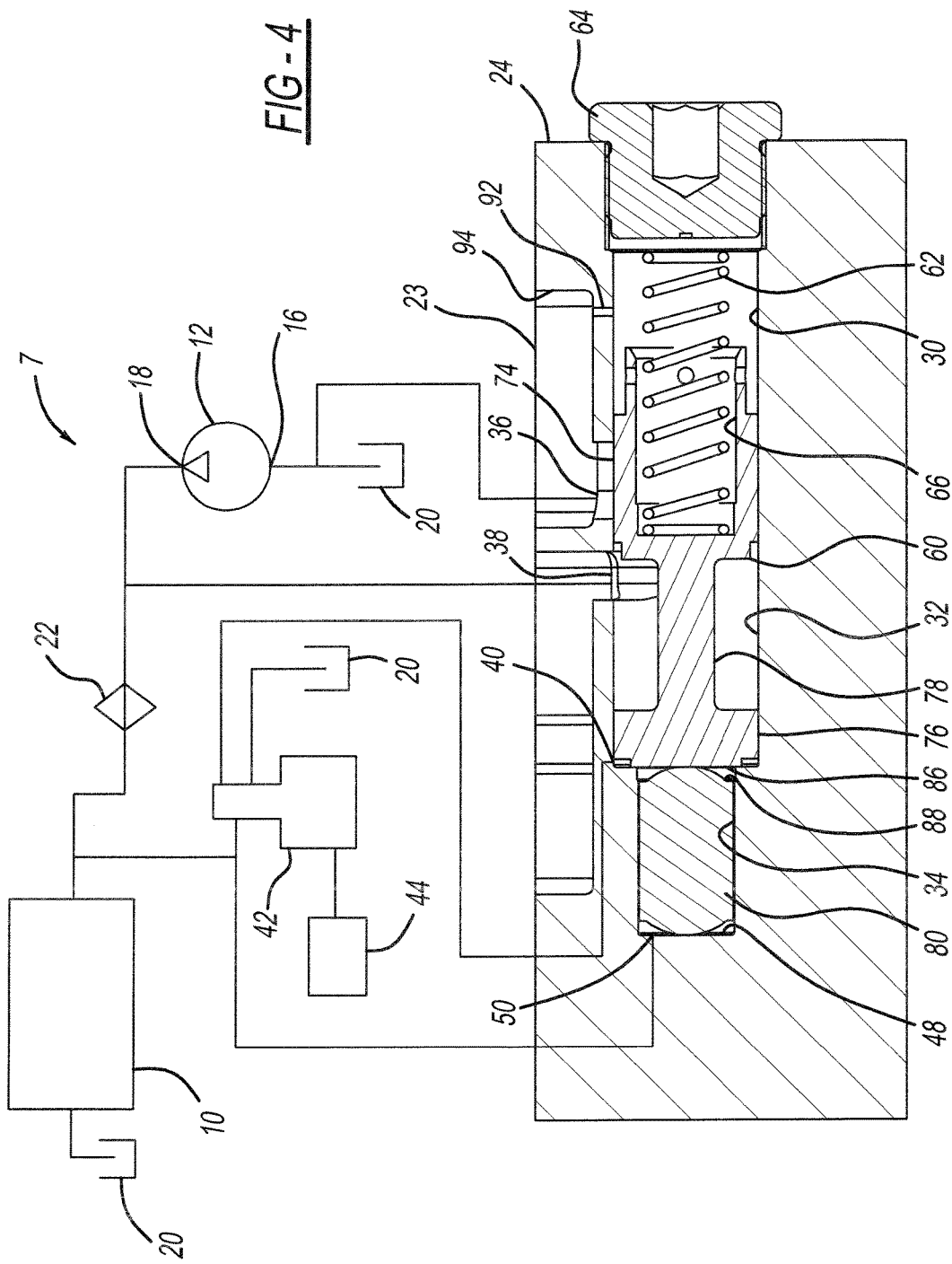
FIG. 4 is a sectional view taken along lines 4-4 of FIG. 3 illustrating a two piece relief valve of the present invention during initial startup of the engine, with other various components of the present invention being shown schematically.
Figure 5:
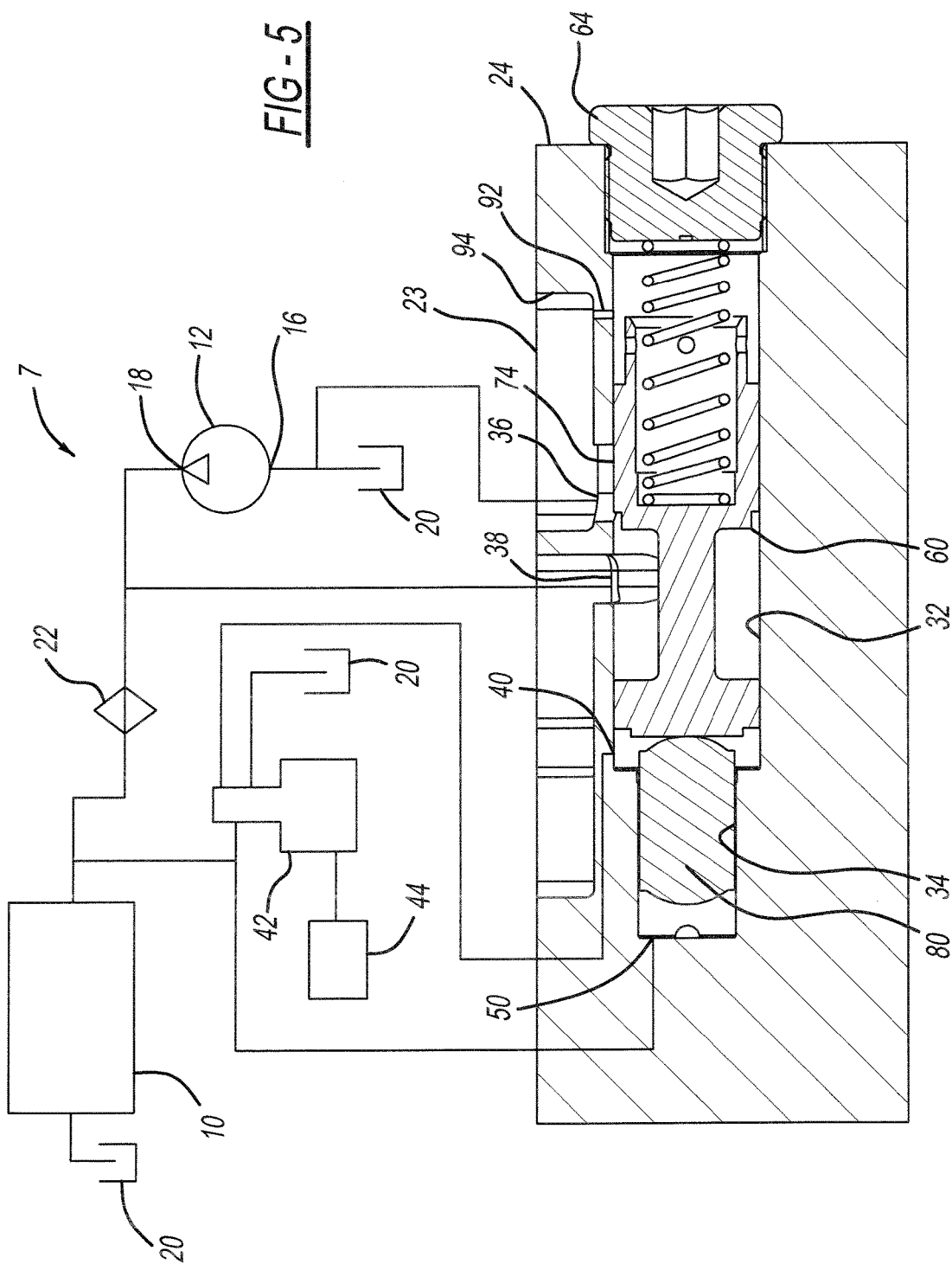
FIG. 5 is a sectional view similar to that of FIG. 4 illustrating the two piece relief valve of the present invention reaching and equilibrium or metering state.
Figure 6:
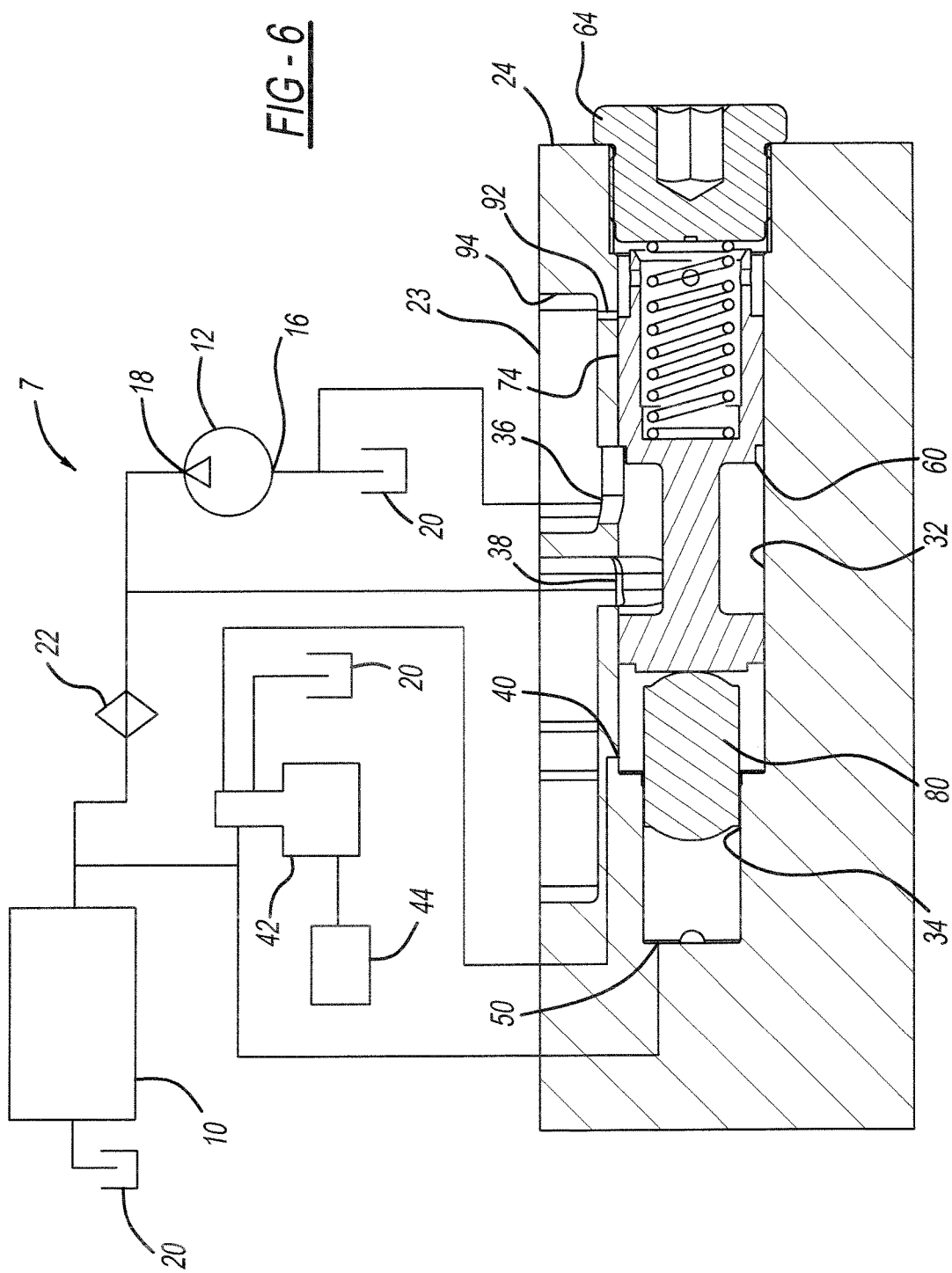
FIG. 6 is a sectional view similar to that of FIG. 4 illustrating the two piece relief valve of the present invention reaching a near flat line state of operation.
Figure 7:
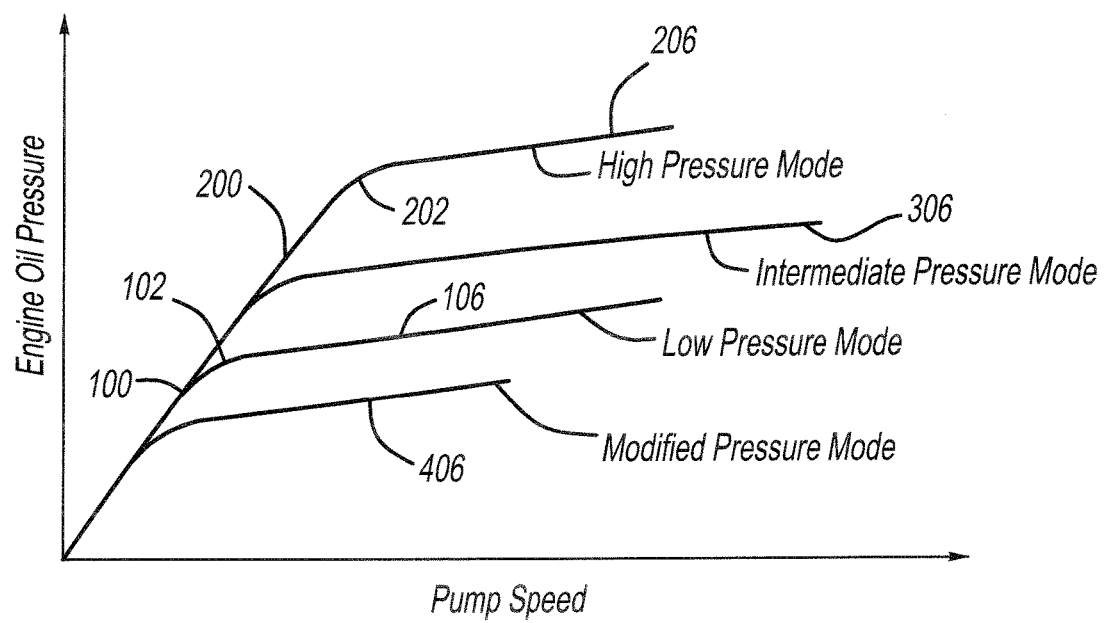
FIG. 7 is a graph illustrating the relationship between engine oil pressure and pumps speed utilizing the lubrication pumping system according to the present invention.

In operation at initial startup engine oil pressure is essentially 0 or sump 20 pressure. The two piece relief valve 23 is in the position shown FIG. 4. By virtue of the biasing force provided by spring 62, the primary piston is moved to its extreme forward position (leftward as shown in FIG. 4) causing the secondary piston 82 to be moved to its extreme position. The speed of the pump 10 is directly proportional to the speed of the engine crankshaft which at startup is 0. Typically, solenoid 42 is commanded during initial startup to place the pilot pressure in the low pressure mode thereby causing the pilot pressure connection 40 to be connected with engine oil pressure. As engine crankshaft speed increases, engine oil pressure in the main oil gallery tends to generally linearly increase along line 100 FIG. 7. The continuing increased engine oil pressure via the engine oil pressure connection 50 acts upon an area of secondary piston 80. The same engine oil pressure also acts upon the opposite side of the secondary piston through the pilot connection 40. Therefore the any force of the secondary piston 80 exerted against the primary piston 60 (or spring 62) is essentially cancelled out. Engine oil pressure acts against the full diameter of the primary piston second landing 76 (essentially equal to the area of the first section 32) causing the primary piston 60 to move rightward to a metering position shown in FIG. 3 compressing coil spring 62. Pressure acting from the pump outlet 18 on the first and second landing 74 and 76 of the primary piston is essentially canceled out. At a point of equilibrium just prior to the metering position shown in FIG. 5, the first landing 74 of the primary piston will be preventing flow from the pump outlet 18 through the two piece relief valve 23 to the pump Inlet 16. The equilibrium position is approximately shown by position 102 in the graph of FIG. 7. Once pump speed increases beyond that of equilibrium pressure 102, the increase engine oil pressure will cause the primary piston 60 to be moved further rightward (FIG. 4) causing the first landing 74 of the primary piston to allow increased flow from the pump outlet connection 38 to the pump inlet connection 36 and thus further increases in engine speed will cause the engine oil pressure to flat line along the path shown by line 106. Power consumption of the pump 12 is generally equivalent to the pump flow rate multiplied by the pressure. The two piece relief valve 29 reduces power consumption by almost retaining a constant flow rate of lubricant delivered to the engine 10 and a nearly constant pressure differential over the pump inlet 16 and out 18 with increased engine speed.

When it is desired for the system 7 to go into a high pressure mode of operation the controller 44 will command the solenoid valve 42 to connect the pilot pressure connection with the sump 20 rather than with the engine pressure. Since pilot pressure is zero, there is no fluid pressure acting upon the primary piston 60 to counteract the spring 62. The metering force is equal to the engine oil pressure via the connection 50 acting on the diameter of the secondary piston or that of the section 34. Therefore, the high to low pressure ratio is be equal to an area ratio of the first and second bore sections 32, 34. With the pilot pressure essentially equal to 0, the secondary piston 80 moves the primary piston 60 to compress spring 62 from the position essentially shown in FIG. 4 wherein the first landing 74 of the primary piston prevents any bypassing of flow between the pump outlet and an inlet causing the system 7 follow the high pressure mode shown by line 200 until such time as the engine oil pressure further acts upon the secondary piston 60 to place the relief valve 23 past the metering position shown in FIG. 5 (position 202 in FIG. 7) to the position shown in FIG. 6 causing the engine oil pressure to flat line in a high pressure mode shown in line 206.

If a different high and low pressure modes are desired for different engines, the high/low pressure modes can be increased or decreased by increasing or decreasing respectively a spring constant of the spring 62. Line 406 is an example of a engine oil pressure pump speed relationship of an engine lubrication pumping system identical to that of system 7 but having a lower low pressure mode by virtue of a biasing spring with a lower spring constant that that of spring 62.

For even greater reduction in parasitic losses, solenoid valve 42 can be a proportional valve allowing the pilot pressure to be define at a value between engine oil pressure and sump pressure. The intermediate pressure mode of operation allows the engine oil pressure pump speed relationship to be define by the line 306. As mentioned previously an intermediate pressure mode can be commanded by the controller 44 based upon a wide variety of engine properties or derivatives thereof.

Figure 8:
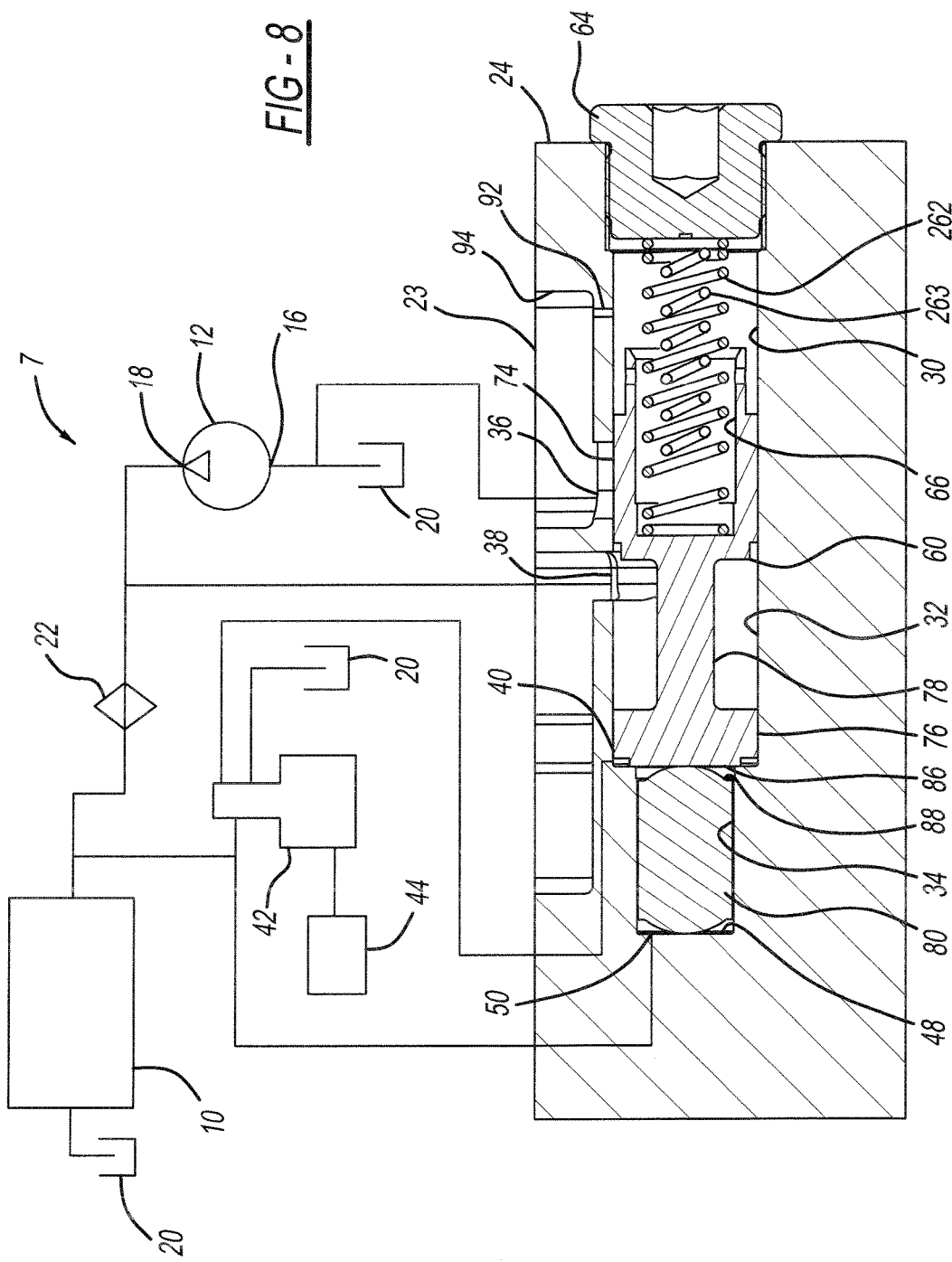
FIG. 8 is a view similar to that of FIG. 4 of an alternator preferred embodiment relief valve with that shown in FIG. 4.
Figure 9:
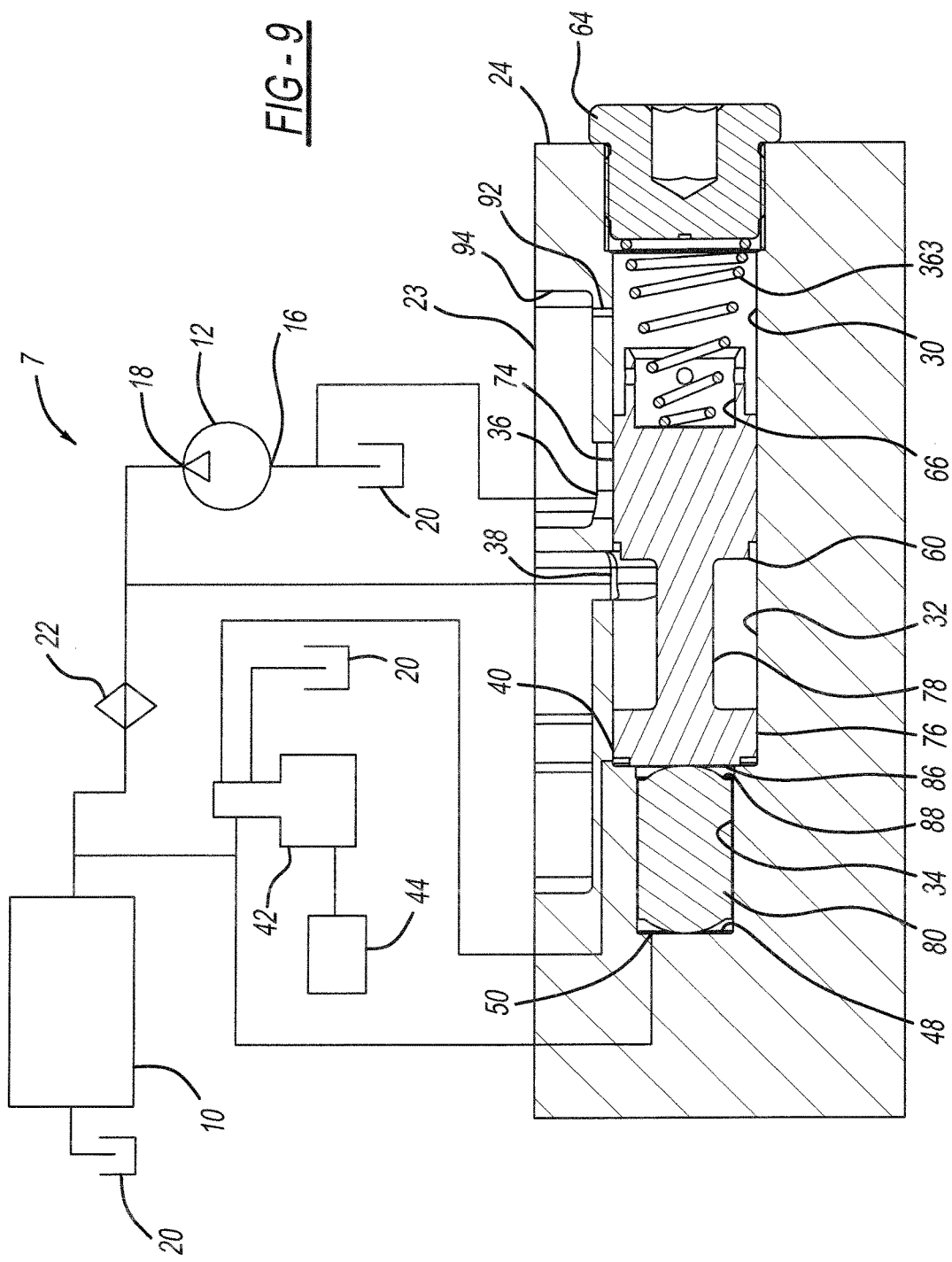
FIG. 9 is a view similar to that of FIG. 4 of an alternator preferred embodiment relief valve to that shown in FIG. 4.

FIG. 8 illustrates a system 107 wherein the biasing spring is a two part 162, 163 member 162 to provide a variable spring constant. The springs in a step wise manner. 162, 163 allow more customized pressure—engine speed relationship that increases pressure at higher engine speeds. FIG. 9 illustrates a conic biasing spring 262 giving a continuously variable spring constant.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lubrication pumping system for an oil lubricated engine of an automotive vehicle comprising:
   a pump with an outlet and an inlet,
   a two piece relief valve having a valve housing with a multi-dimensional bore having a first section axially intersecting with a second section, said first section has axially separated fluid connections for said pump outlet, said pump inlet, and a pilot pressure, said second section being connected with an engine oil pressure connection axially separated from said pilot pressure connection of said first section;
   a pressure mode selection valve connected with said pilot pressure connection for selectively connecting said pilot pressure connection with an engine oil pressure and a sump;
   a primary piston slidably mounted in said first section having a first landing metering flow to said pump inlet connection and a second landing dividing said first section exposed to said pump outlet connection from said first section exposed to said pilot pressure connection, said primary piston being spring biased in a direction toward said second section; and
   a secondary piston slidably mounted in said second section dividing said second section exposed to said engine pressure connection from said second section exposed to said first section, said secondary piston being acted upon by said engine oil pressure, said pilot pressure and said primary piston to position said primary piston to control flow from said pump inlet connection to said pump outlet connection, wherein said primary piston and said secondary pistons have faces fronting each other having semi uni-point contact.

2. A lubrication pumping system as described in claim 1 wherein said second section is smaller in diameter than said first section.

3. A lubrication pumping system as described in claim 1 wherein said pump is torsionally connected with a crankshaft of said engine.

4. A lubrication pumping system as described in claim 1 wherein said pump is a constant displacement pump.

5. A lubrication pumping system as described in claim 1 wherein said secondary piston has a conic cross-sectional surface fronting face and said primary piston has a flat surface face.

6. A lubrication pumping system as described in claim 1 wherein said pressure mode selection is a solenoid valve having on off control.

7. A lubrication pumping system as described in claim 6 wherein said solenoid valve is a proportional pressure control valve.

8. A lubrication pumping system as described in claim 7 wherein said solenoid valve is a duty cycle valve.

9. A lubrication pumping system as described in claim 6 wherein a controller commands said pressure mode selection based upon an engine property taken from the group including engine speed, engine or engine oil temperature, valve actuation, valve timing, main oil gallery pressure, power demand, or derivatives thereof.

10. A lubrication pumping system as described in claim 1 wherein said first section and second section are concentric with one another.

11. A lubrication pumping system as described in claim 1 wherein said primary piston and secondary piston, said housing, first section and second section do not have sealing rings.

12. A lubrication pumping system as described in claim 1 wherein said primary piston is bias by a spring having a variable spring constant.

13. A lubrication pumping system as described in claim 12 wherein said variable spring constant is continuously variable.

14. A method of lubricating an oil lubricated engine of an automotive vehicle comprising:
   providing a pump with an outlet and an inlet;

providing a two piece relief valve having a valve housing with a multi-dimensional bore having a first section axially intersecting with a second section having a differing diameter than the first section, said first section has axially separated fluid connections for said pump outlet, said pump inlet, and a pilot pressure, said second section being connected with an engine oil pressure connection axially separated from said pilot pressure connection of said first section;

connecting a pressure mode selection with said pilot pressure connection and selectively connecting said pilot pressure connection with an engine oil pressure and a sump;

slidably mounting in said first section a primary piston having a first landing metering flow to said pump inlet connection and a second landing dividing said first section exposed to said pump outlet connection, from a portion of said first section exposed to said pilot pressure connection, and spring biasing said primary piston in a direction toward said second section;

providing a secondary piston slidably mounted in said second section, dividing said second section exposed to said engine pressure from said second section exposed to said first section, acting upon said secondary piston with engine oil pressure, pilot pressure to position said primary piston to control flow from said pump outlet connection to said pump inlet connection, wherein said primary piston and said secondary pistons have faces fronting each other having semi uni-point contact.

15. A valve for a lubrication pumping system for an oil lubricated engine of an automotive vehicle comprising:

a valve housing with a multi-dimensional bore having a first section axially intersecting with a second section having a diameter that is smaller than the first section, said first section has axially separated fluid connections for connection with a pump outlet and inlet, and a pilot pressure, said second section having a connection for an engine oil pressure inlet axially separated from said pilot pressure connection of said first section;

a primary piston slidably mounted in said first section having a first landing metering flow to said pump inlet connection and a second landing dividing said first section exposed to said pump outlet connection from said first section exposed to said pilot pressure connection, said primary piston being spring biased in a direction toward said second section;

a secondary piston slidably mounted in said second section, dividing said second section exposed to said engine pressure connection from said second section exposed to said first section, said secondary piston having semi-unipoint contact with a face of said primary piston; and a spring in contact with and biasing the primary piston, wherein the spring has a variable spring constant.

16. A valve as described in claim 15 wherein said spring has a continuously variable spring constant.

* * * * *